United States Patent [19]

Klaus et al.

[11] Patent Number: 5,245,307
[45] Date of Patent: Sep. 14, 1993

[54] SEARCH COIL ASSEMBLY FOR ELECTRICALLY CONDUCTIVE OBJECT DETECTION

[75] Inventors: Ausländer Klaus, Reutlingen; Fabris Hans-Jürgen, Pfullingen; Möck Karl-Heinz; Patzwald Wolfgang, both of Reutlingen; Seichter Helmut, Pfullingen, all of Fed. Rep. of Germany

[73] Assignee: Institut Dr. Friedrich Forster Pruferatebau GmbH & Co. KG, Reutlingen, Fed. Rep. of Germany

[21] Appl. No.: 966,594

[22] Filed: Oct. 26, 1992

Related U.S. Application Data

[63] Continuation of Ser. No. 502,289, Mar. 30, 1990, abandoned.

Foreign Application Priority Data

Apr. 18, 1989 [DE] Fed. Rep. of Germany ....... 3912840

[51] Int. Cl.⁵ ............................ H01F 5/00; H01F 27/28
[52] U.S. Cl. ..................................... 336/200; 336/226; 336/228; 336/232
[58] Field of Search ................ 324/329, 239; 336/200, 336/232, 226, 228, 225; 310/268

[56] References Cited

U.S. PATENT DOCUMENTS

| | | | |
|---|---|---|---|
| 2,129,058 | 9/1938 | Hedden | 324/329 X |
| 2,921,280 | 1/1960 | Litwin et al. | 336/200 |
| 3,002,260 | 10/1961 | Shortt et al. | 336/200 |
| 3,054,011 | 9/1962 | Silverschotz et al. | 336/200 |
| 3,133,249 | 5/1964 | Parker | 336/200 |
| 3,466,580 | 9/1969 | Bull | 336/200 |
| 4,246,446 | 1/1981 | Yoshida et al. | 336/228 |
| 4,340,833 | 7/1982 | Sudo et al. | 310/268 |
| 4,345,208 | 8/1982 | Wilson | 324/329 |
| 4,598,276 | 7/1986 | Tait | 336/200 |

FOREIGN PATENT DOCUMENTS

| | | | |
|---|---|---|---|
| 2446605 | 4/1976 | Fed. Rep. of Germany | 336/232 |
| 3619308 | 12/1987 | Fed. Rep. of Germany | 324/329 |
| 1185354 | 7/1959 | France | 336/200 |
| 59-105304 | 6/1984 | Japan | 336/200 |
| 1094183 | 12/1967 | United Kingdom | 336/200 |

*Primary Examiner*—Thomas J. Kozma
*Attorney, Agent, or Firm*—George J. Netter

[57] ABSTRACT

A search coil assembly for an inductive search device of the transmitter/receiver type is described having advantages relative to manufacture, repeat accuracy and sensitivity in operation. This is made possible by the utilization of printed-circuit board technology in search coil construction in which electrically conductive windings in the form of a conductor band of circuit tracks are arranged side-by-side at the periphery of partial areas on a carrier layer common to the partial areas.

4 Claims, 5 Drawing Sheets

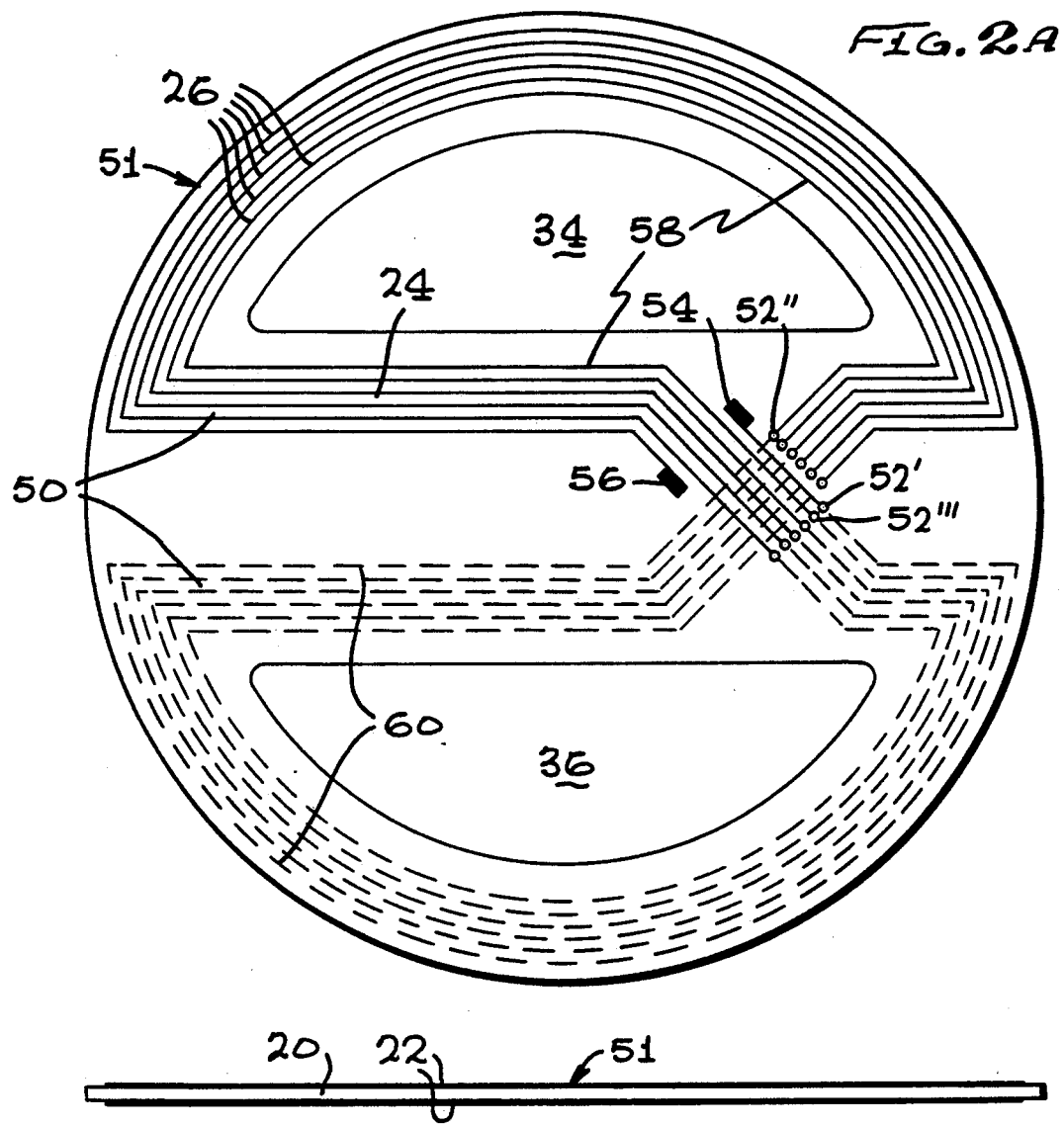
FIG. 2A
FIG. 2B
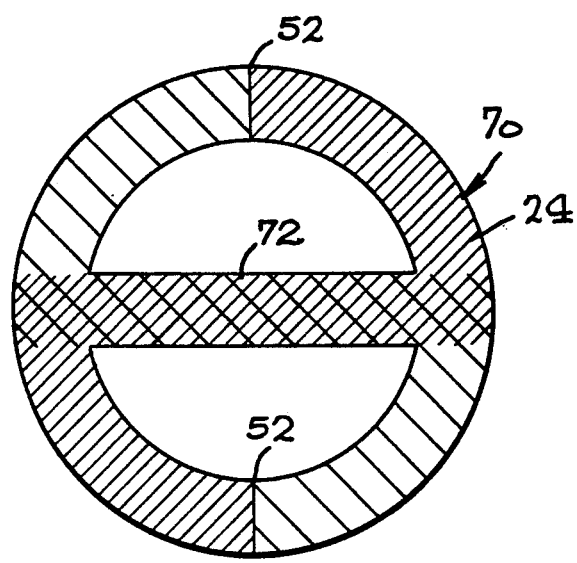
FIG. 3

SEARCH COIL ASSEMBLY FOR ELECTRICALLY CONDUCTIVE OBJECT DETECTION

This application is a continuation of application Ser. No. 07/502,289 filed Mar. 30, 1990, now abandoned.

BACKGROUND OF THE INVENTION

1. Field of the Invention

The present invention relates generally to a device for inductively detecting electrically conductive objects, and, more particularly, to a search coil assembly for use in such devices.

2. Description of Related Art

Inductive search devices are used for detecting objects of electrically conductive material which are hidden from sight as they are, e.g., buried, in the soil or are surrounded by other materials having a lower electrical conductivity. It is possible with such devices either to pass the search device over a surface to be scanned as well as to pass goods to be tested past a stationary search device. In either case, an electrical signal voltage is generated as a result of the relative movement between the objects sought and the search device, such voltage being transformed into a signal capable of human detection, e.g., an acoustic or optical signal.

Search coil assemblies of the aforementioned species are known in the art in various embodiments. For example, there is known an American mine search device, wherein the receiver coil of the search coil assembly has four partial coils connected pair-wise in opposition to each other and arranged in a common plane. Such partial coils are received in depressions of a plate-type housing, which are located at the four corners of a square. The disadvantage of this search coil assembly is that deformation of the housing caused by thermal or other influences will immediately affect the position of the individual receiver coils with respect to one another and their position with respect to the energizing or excitation coil. This will result in lack of stability and in a permanent drift of the output voltage of the receiver coils. Another disadvantage is the heavy weight of such a search coil assembly. Furthermore, it is disadvantageous that the partial coils must be rather accurately identical in their coil characteristics requiring high precision of winding.

SUMMARY OF THE INVENTION

In contrast to the known prior art, it is an object of the invention to provide a search coil assembly of several partial coils having acceptable match of the coil characteristics with respect to each other, a high repeat accuracy, and relatively low expense of manufacture.

According to one aspect of the invention, layout of the coil assembly is accomplished under magnification providing very high geometrical accuracy. The layout once produced can then be reproduced with high reliability and in any desired quantity. The cost of producing the layout can be divided by the total number of search coil assemblies to be produced and is therefore of no great importance. In contrast to a housing exposed to all external influences, the carrier layer common to the partial coil areas guarantees that the position of the partial areas with respect to each other can be maintained with high accuracy. Considerable savings of weight are also achieved with the construction according to the invention.

According to an advantageous embodiment of the invention, coil differential connection is not formed only by connection of partial coils in opposition, but is formed separately for each winding. This is effected by composing the individual coil windings from pairs of conductor loops including one partial coil area each, such conductor loops having opposed senses of winding. In this way, the induction of high potentials in the partial coils corresponding to the number of windings are prevented. Instead, now only the potential differences of the individual windings are summed up. Low potentials are desired, because the formation of parasitic capacitive stray currents to ground and, in particular, to a shield at ground potential is the greater, the higher the respective potentials are. From the basic relationship, $$Q = C \cdot U$$

Q being the electrical charge, C the stray capacitance and U the existing potential, it follows $$I = dQ/dt = C\, dU/dt.$$

Of particular importance are those stray currents I, where higher frequencies or different frequencies are involved.

According to another embodiment of the invention, the crossing at the interface between opposed-sense conductor loops takes place on either side of a carrier layer, the required electrical connections from one side of the carrier layer to the other being effected by through-plated holes.

From yet another embodiment of the invention, either side of the carrier layer can be provided a conductor band with opposed-sense conductor loops.

A further and advantageous embodiment of the invention describes how higher numbers of windings can be achieved in multi-layer coil constructions than are possible with only one carrier layer.

Of high importance, in particular for multi-frequency devices and when applying higher frequencies, is a still further embodiment allowing for further reduction of induced potentials. When combining two conductor loops to a winding, there is effected a change from one side of the conductor band to the other side thereof replacing interior conductor loops with exterior ones. The areas surrounded by the conductor loops are, therefore, not accurately identical. Accordingly, there is added to the positively occurring change of sides another change of sides in the course of such winding.

Yet another version utilizes cut-outs in the carrier layer providing additional savings in weight and improvement of mobility.

BRIEF DESCRIPTION OF THE DRAWINGS

In the following, the invention is described in more detail based on embodiments shown in the drawings. There are:

FIG. 2A is a top plan view of an embodiment of the invention;

FIG. 2B is a side elevational view of FIG. 2A;

FIG. 3 depicts a receiver coil in diagrammatical representation;

FIG. 4A is a top plan view of a receiver coil;

FIG. 4B is a fragmentary view of FIG. 4A showing connections on the reverse side;

FIG. 4C is a side elevational view of FIG. 4A;

DESCRIPTION OF PREFERRED EMBODIMENTS

Figure 1:
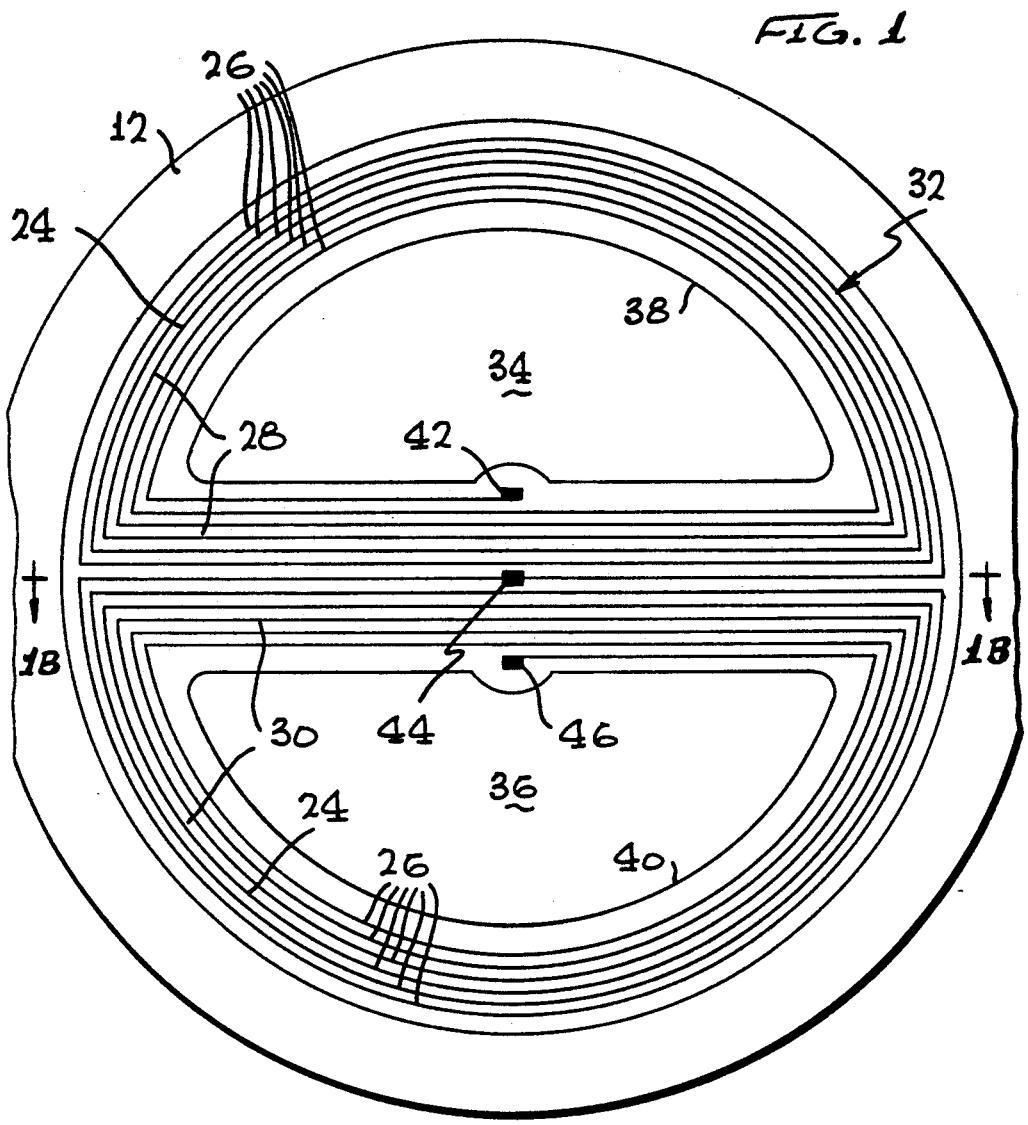
FIG. 1 is a top plan of a search coil assembly according to a first embodiment of the invention.
Figure 1B:
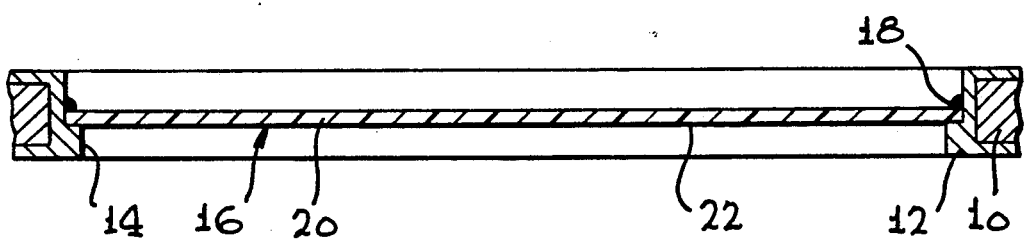
FIG. 1B is a side elevational view taken along the line 1B——1B of FIG. 1A.
Figure 9A:
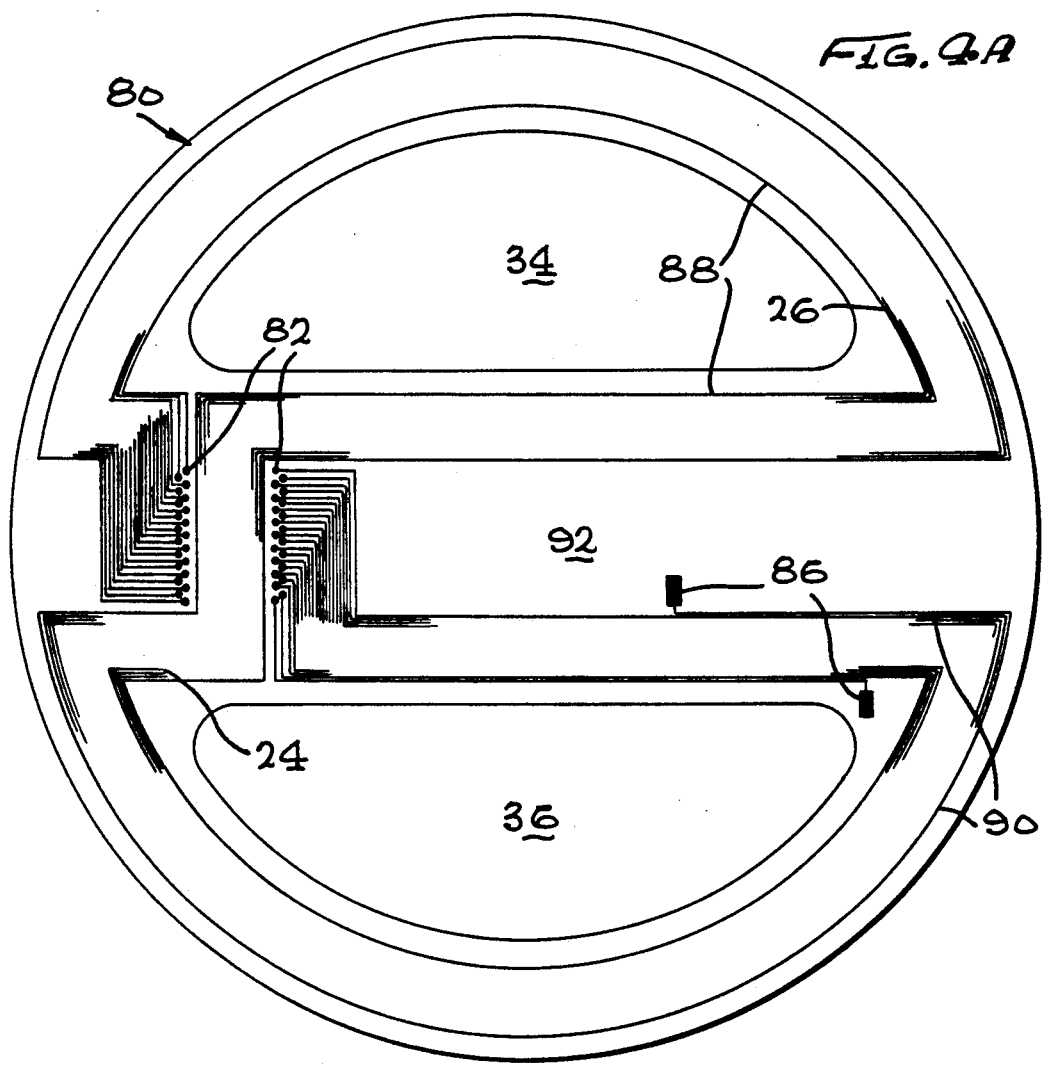
Figure 9C:
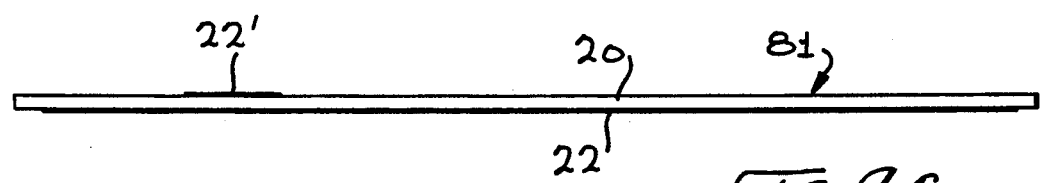
Figure 9B:
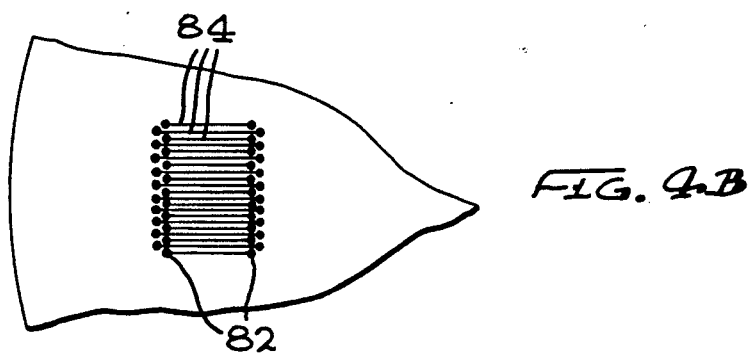

In FIGS. 1A and 1B there is shown a search coil assembly according to the invention in a first embodiment including an excitation coil 10 being wound in usual manner onto a coil frame 12. A shoulder 14 in the bore of the coil frame 12 bears a printed-circuit board 16 fixed by an adhesive 18 or in another suitable manner to the coil frame 12. The printed-circuit board 16 comprises, in well-known manner, a carrier layer 20 and circuit tracks 22 disposed thereon, the latter being arranged closely side-by-side in the form of conductor bands 24. For the sake of simplicity, only 6 circuit tracks are drawn. It is possible without any difficulty, however, to have conductor bands of similar width with 20 to 30 circuit tracks. The circuit tracks 22 form the windings 26 of two partial coils 28, 30 combined to form a receiver coil 32.

The partial coils 28, 30 each include with the conductor tracks 24 partial areas 34, 36 which are slightly larger than the areas created by cutouts of the carrier layer 20 along lines 38, 40. The partial coil 28 begins at a terminal 42 and ends at a central tap 44, while partial coil 30 begins at the central tap 44 and ends at a terminal 46. As the two partial coils 28, 30 are connected in opposition to each other, and as the field of the operator coil induces equal voltages in them, there will be no voltages at the terminals 42, 46, as long as the symmetry of the magnetic field is not disturbed by eddy-current reactions, such as caused by the presence of search objects, for example.

FIGS. 2A and 2B show the printed-circuit board 51 for a receiver coil 50 of a search coil assembly in a top plan view and in side elevational view, respectively. On both sides of the carrier layer 20 are provided circuit tracks 22. The circuit tracks 22 are, in turn, disposed side-by-side in the form of a conductor band 24, one-half thereof being located on the top side, the other half (shown in dashed lines) on the bottom side of the carrier layer 20. Through-plated holes 52', 52", 52''' connect in known manner the circuit tracks 22 of top with those on the bottom side, such circuit tracks ending at terminals 54 and 56.

The basic difference from the receiver coil 32 according to FIG. 1 is that the windings 26 of FIG. 2 are each composed of two.-conductor loops having opposed senses of winding. For example, a conductor loop 60 begins at a through-plated hole 52' connected to the terminal 54 and ends at another through-plated hole 52". It is continued in another conductor loop 58 ending in turn at a through-plated hole 52'''. The partial top loops collectively enclose a partial area 34 and the bottom loops similarly enclose a partial area 36. The resulting crossing of the conductor band 24 is thus formed on the two sides of the carrier layer 20. Of importance is the fact that under certain conditions that the abutting opposed-sense partial loops 58 and 60 have identical geometrical shape. Differences in length of the individual partial loops 58 and 60 result from the fact that for each abutment of two conductor loops, a change from one side of the conductor band 24 to the other results. The conductor loop 58 is, e.g., on the interior side of the conductor band 24, whereas the conductor loop 60 is on the exterior side thereof. This will be discussed in detail later.

FIG. 3 shows in diagrammatical representation a receiver coil 70, wherein the through-plated holes 52 are not arranged near to the crossing of the conductor band 24, but rather at the center of the top or bottom section of the conductor band. In this manner, it is intended to show, on one hand, that the arrangement of the through-plated holes 52 can be located at any position. On the other hand, the arrangement of FIG. 3 has the advantage that the central sections 72 of the conductor band are immediately facing each other and, therefore, require little space. For the representation of FIG. 3, a wide cross-hatching has been selected for the top side of the carrier layer 20, and a narrow one for the bottom side.

FIGS. 4A, 4B and 4C depict a receiver coil 80 in a realistic layout which differs, in principle, from the receiver coils according to FIGS. 2 and 3 in that the through-plated holes 82 are disposed at a different position. One can see the printed-circuit board 80 in FIGS. 4A and 4B from below and above, respectively, and in FIG. 4C from the edge. The through-plated holes 82 are arranged on both sides of the conductor band 24 so that cross leads to the circuit tracks 22 on the rear side of the carrier layer 20 can be simple short bridges 84. The signal voltage of the receiver coil 80 is available at the two terminals 86.

The construction of the windings 26 from conductor loops 88, 90 so as to be connected in opposition is as has been previously described. The arrangement of the receiver coil 80 depicted in FIG. 4 offers, additionally, the advantage that in a simple way several crossings can be disposed side-by-side on the center strip 92 of the carrier layer 81.

Figure 5B:
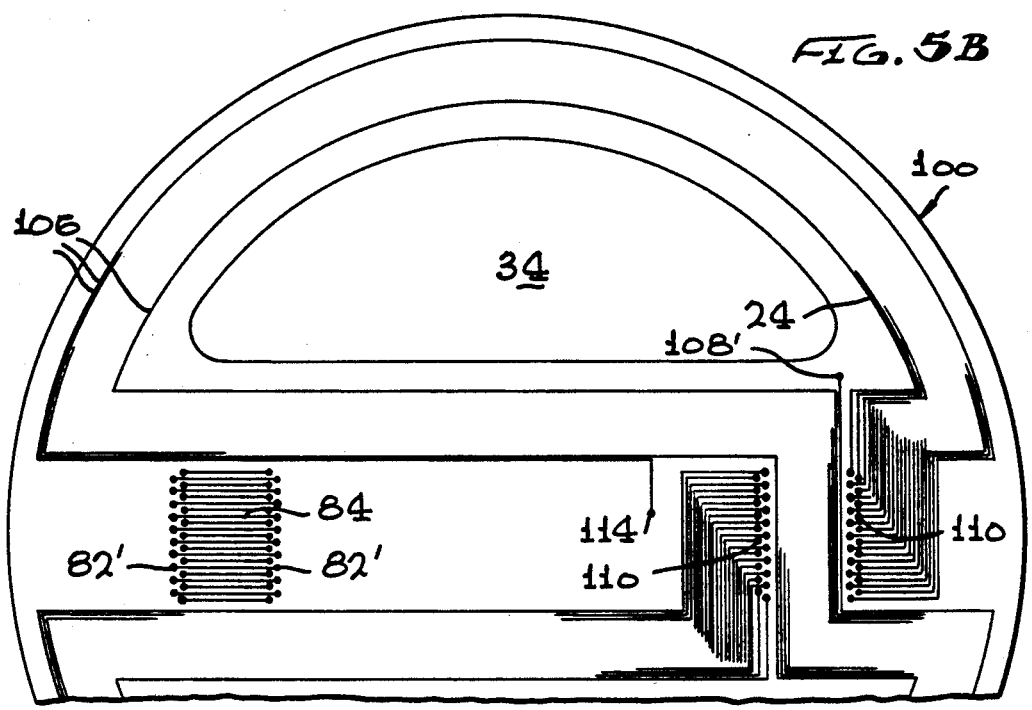
FIGS. 5A and 5B are top and bottom plan views, respectively, of another version of receiver coil.
Figure 5A:
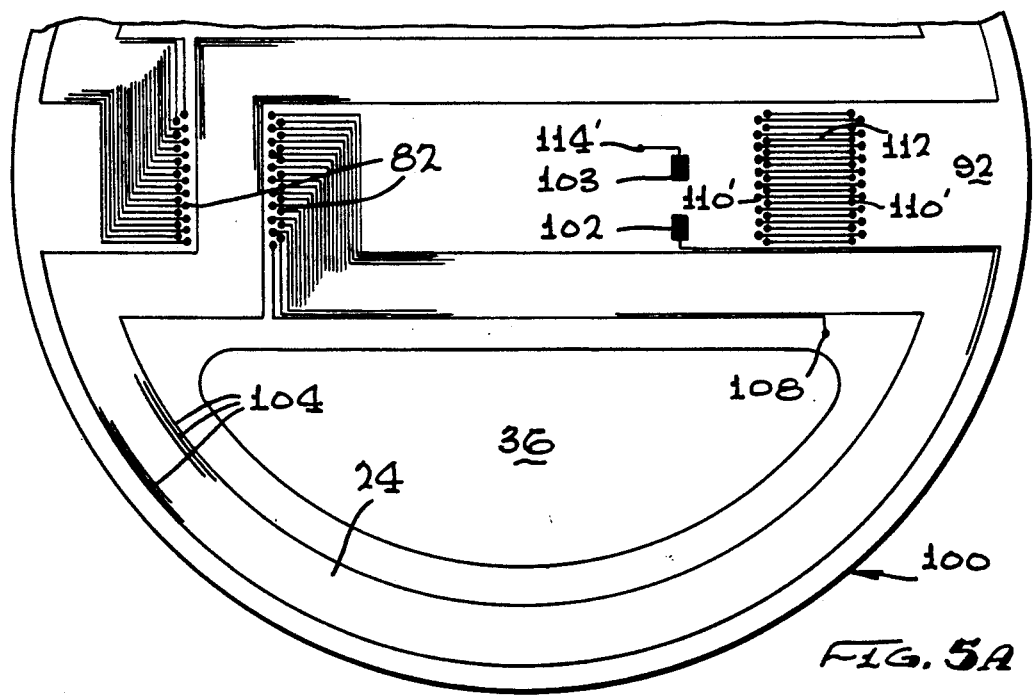
Figure 5C:
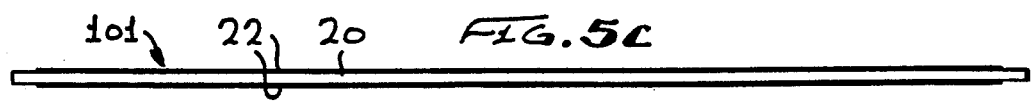
FIG. 5C is a side elevational view thereof.

FIG. 5 shows how this is applied for a similar receiver coil 100 with terminals 102, 103, such receiver coil being composed of windings 104 and 106 on the top or on the bottom, respectively, sides of the carrier layer 20. In FIGS. 5A and 5B, the upper and bottom, respectively, sides of a printed-circuit board 101 with receiver coil 100 are shown, and FIG. 5C shows a front edge view. The windings 104 on the top side are built up in equal manner to those of the receiver coil 80, and are connected via through-plated holes 82 and bridges 84. With the windings 104 beginning at the terminal 102, the end is obtained after running through all windings 104, through-plated holes 82 and bridges 84 to a through-plated hole 108. The latter coincides with a through-plated hole 108' (FIG. 5B) on the bottom side and forms there the beginning of the windings 106. Via through-plated holes 110 and bridge 112, the windings 106 arrive at through-plated hole 114 and is finally connected to the terminal 103. In this way, the two partial areas 34, 36 are surrounded by conductor bands 24 allowing for a doubled number of windings relative to the earlier described receiver coil 80.

Figure 6:
FIG. 6 is a side elevational view of a multi-layer receiver coil.

Another increase in the number of windings of the receiver coil can be achieved by application of multi-layer technology, as is shown in FIG. 6. In the present example, a printed-circuit board 121 includes four layers 122 of circuit tracks held separated from each other by three carrier layers 120. The construction of two layers of circuit tracks can be effected substantially according to the embodiment of FIG. 5. The two remaining layers of circuit tracks can also be built up in identical manner. It is only necessary to provide the remaining layers at locations on the center strip 92 free of through-plated holes and bridges. In this way, the circuit tracks of, in the present case, four layers 122 can be connected in series, resulting in the number of windings being quadrupled relative to the previously described receiver coil 80 (FIG. 4).

Figure 7:
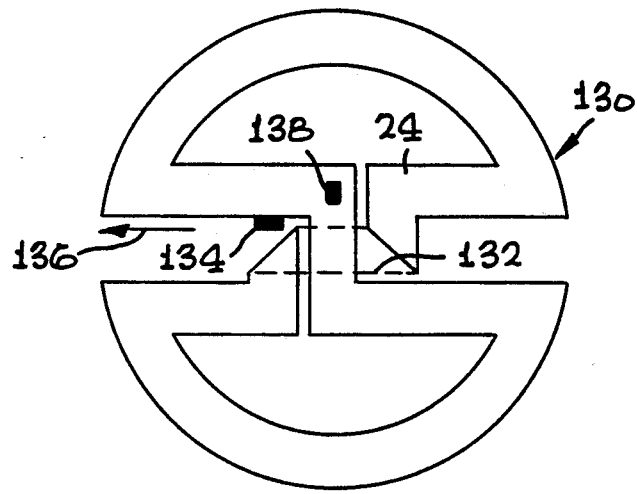
FIG. 7 is a receiver coil in diagrammatical representation.
Figure 8:
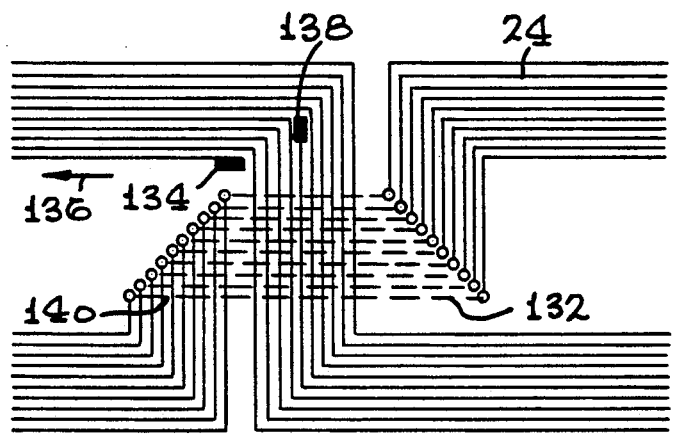
FIG. 8 is a detail of FIG. 7.

FIGS. 7 and 8 show how the capacitive stray currents can effectively be further lowered. For example, FIG. 7 shows in diagrammatical manner a receiver coil 130, which can be employed in search coil assemblies according to the invention and FIG. 8 is an enlarged representation of the crossing area of the conductor band 24. In both cases, the bridges 132 are disposed on the rear side of the carrier layer and drawn in dashed lines. As already explained above, the abutting conductor loops of opposed sense for the receiver coils described up to this point are not fully coincident. The potential induced in the loops will, therefore, not compensate each other completely. Instead, residual potential increases linearly from winding to winding up to the center of the conductor band 24, and is reduced, then, linearly in the same manner to zero at the last winding. If conductor loops fitting with respect to each other are combined, the generation of residual potentials can be prevented a priori. This is possible, e.g., by an arrangement of the receiver coil according to FIGS. 7 and 8. If it proceeds from a terminal 134 in the direction of arrow 136, the following sequence of conductor loops is achieved:

top outermost - bottom outermost
 top innermost - bottom innermost
 top outermost but one - bottom outermost but one
 top innermost but one - bottom innermost but one
and so on.

This is continued until the receiver coil 130 ends with the terminal 138 in the center of the conductor band 24. In this way, only equivalent conductor loops will abut each other, and the potentials compensate each other for each winding. A simple means allows the change of sides additionally required within the conductor band: When changing from one side of the carrier layer to the other, an undercut 140 is performed for each winding, i.e. part of the windings of the conductor band 24 are passed under at this location in order to arrive at the other side of the conductor band.

What is claimed is:

1. A search coil assembly having an excitation coil producing an alternating magnetic field, an area-type receiver coil located in the magnetic field and including a plurality of windings, the receiver coil having a total area composed of at least two partial areas displaced relative to each other, voltages induced in the winding located in the partial areas substantially compensating each other at the output of the receiver coil by forming difference voltages, comprising:

the receiver coil including at least one carrier layer of electrically insulating material common to the at least two partial areas;
 the receiver coil windings being deposited at the periphery of the partial areas in the form of a band of conductive circuit tracks arranged side-by-side in a generally figure-8 configuration;
 the individual windings including pairs of conductor loops, each loop of each pair overlying a respectively different partial area, the senses of winding of the conductor loops of a pair being opposed to each other;
 the carrier layer having first and second oppositely directed surfaces with the conductor loops of each pair being located on said first surface; and
 means for interconnecting windings of respective pairs of loops to one another located on the carrier layer second surface.

2. A search coil assembly as in claim 1, in which the means for interconnecting windings includes undercuts passing through the carrier layer between the first and second surfaces.

3. A search coil assembly as in claim 1, in which the carrier layer first surface is generally planar.

4. A search coil as in claim 1, in which the band of conductive circuit tracks is configured and connected via the interconnecting means with the outermost track of one loop being connected tot he outermost track of the other loop, the outermost track of the other loop tot he innermost track of the one loop, the innermost track of the one loop to the innermost track of the other loop, the innermost track of the other loop to the outermost trackless one of the one loop, and so on.

* * * * *